July 30, 1946.  P. F. SCOFIELD  2,405,060
STARTER TEST STAND
Filed June 29, 1944  4 Sheets-Sheet 2

Fig. 2.

INVENTOR.
PHILIP F. SCOFIELD.
BY
ATTORNEY

July 30, 1946. P. F. SCOFIELD 2,405,060
STARTER TEST STAND
Filed June 29, 1944 4 Sheets-Sheet 3

INVENTOR.
PHILIP F. SCOFIELD.
BY
Frank H. Harmon
ATTORNEY

July 30, 1946.  P. F. SCOFIELD  2,405,060
STARTER TEST STAND
Filed June 29, 1944  4 Sheets-Sheet 4

INVENTOR.
PHILIP F. SCOFIELD
BY
Frank H. Harmon
ATTORNEY

Patented July 30, 1946

2,405,060

UNITED STATES PATENT OFFICE 2,405,060

STARTER TEST STAND

Philip F. Scofield, Cleveland Heights, Ohio, assignor, by mesne assignments, to Jack & Heintz Precision Industries, Inc., Cleveland, Ohio, a corporation of Delaware Application June 29, 1944, Serial No. 542,709

4 Claims. (Cl. 73—118)

This invention relates to a portable test stand for testing aircraft starters and the like.

The general object of the invention is to provide a compact and rugged portable dynamometer test stand for testing aircraft starters, energizers and the like which is adapted for use in the field to give reliable results with speed and facility.

A particular object of the invention is to provide an absorption brake torque testing device which is particularly adapted for use with inertia type aircraft starters.

A further object is to provide an aircraft starter testing unit designed to readily accommodate both left and right hand rotating starters of different sizes which will indicate the rotational speed and torque developed in a simulated starting operation.

A still further object is to provide a test stand of the type described having novel quick acting self-positioning clamping means to removably hold a starter rigidly thereon.

These and other objects and advantages will become apparent as the description proceeds in connection with the accompanying drawings illustrating a preferred embodiment of the invention in which:

Figure 2 is a side elevational view with parts shown in section;

Figure 1:
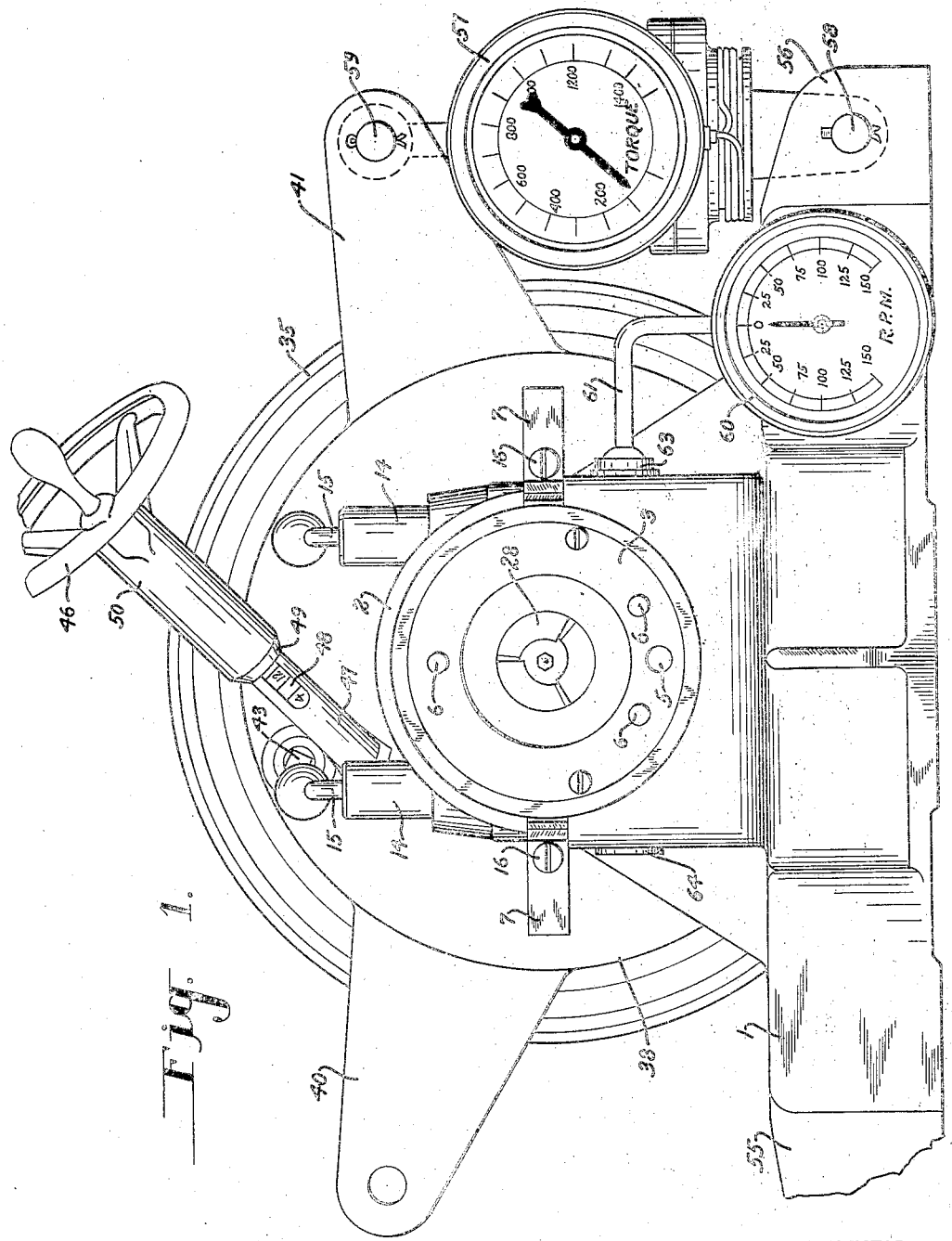
Figure 1 is a front elevational view of the test stand.
Figure 3:
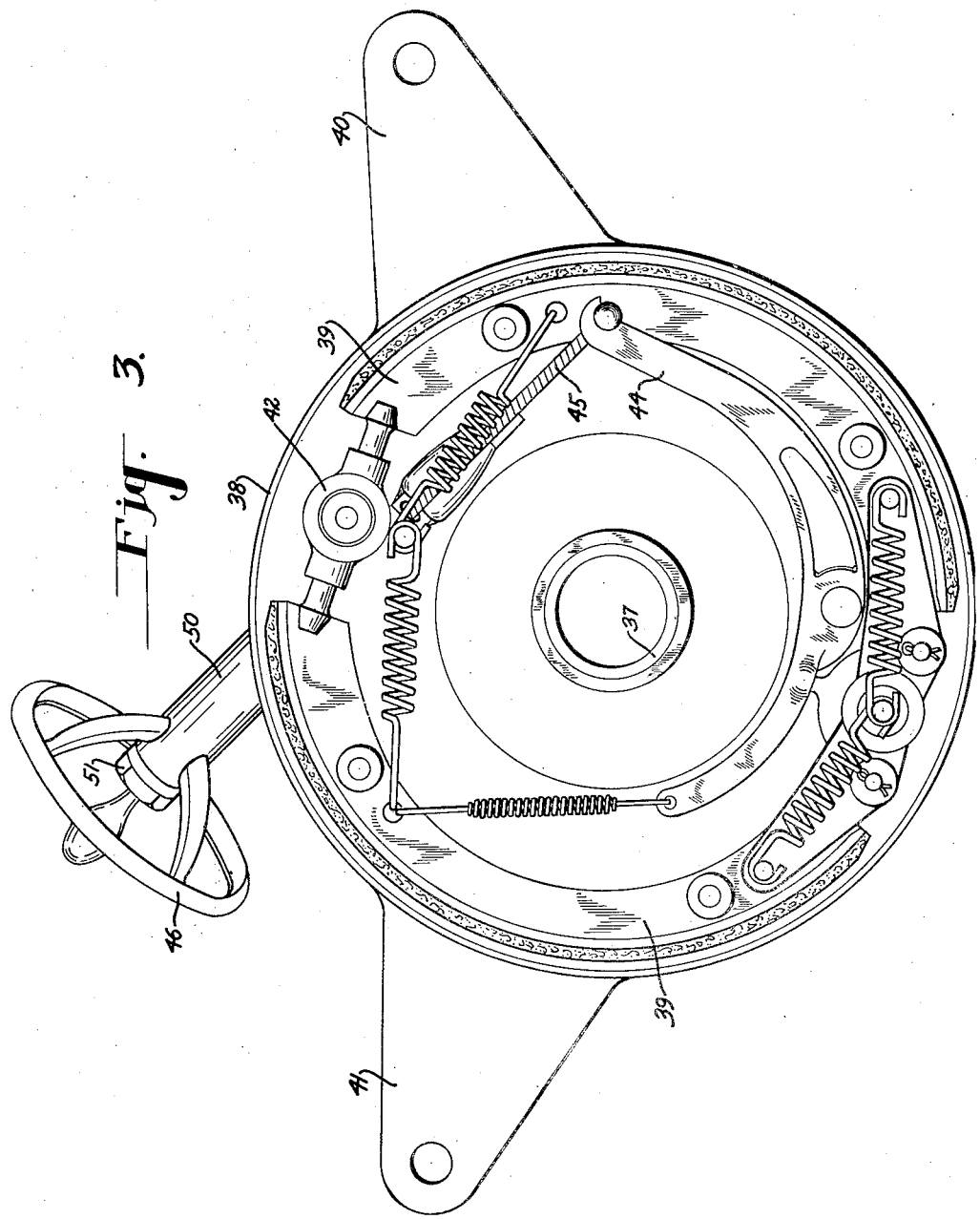
Figure 3 is a view in rear elevation of the absorption brake structure and torque arms, the driving shaft not being shown.

The device comprises generally a combined base and frame 1, best shown in Figures 1 and 2, having means to clamp a starter thereon in driving engagement with a rotatable shaft, and brake mechanism, best shown in Figure 3, for absorbing the energy of said shaft and responding to the torque thereof.

Cast integrally with the base 1 is a cylindrical head 2 carrying a reversible mounting plate 3 which accommodates starters with different sized mounting flanges. The mounting plate 3 is removably carried in an annular recess 4 in the head 2 in the manner shown in Figure 2, rotation being prevented by a large dowel 5 on the head 2.

The mounting plate 3 itself carries a plurality of dowels 6 and 6' on opposite sides thereof arranged to enter holes in the starter mounting flange to prevent rotation of the starter on the mounting plate, the dowels 6 being arranged to fit a different sized starter flange than the dowels 6'. Thus the plate 3 may be turned over to present the dowels 6' outwardly, the dowels 6 being then disposed within the head 2. Openings may be provided in the plate 3 for observation of the starter jaw in operation. A pair of clamping arms 7 are provided to hold the starter clamped tightly against the mounting plate.

Figure 4:
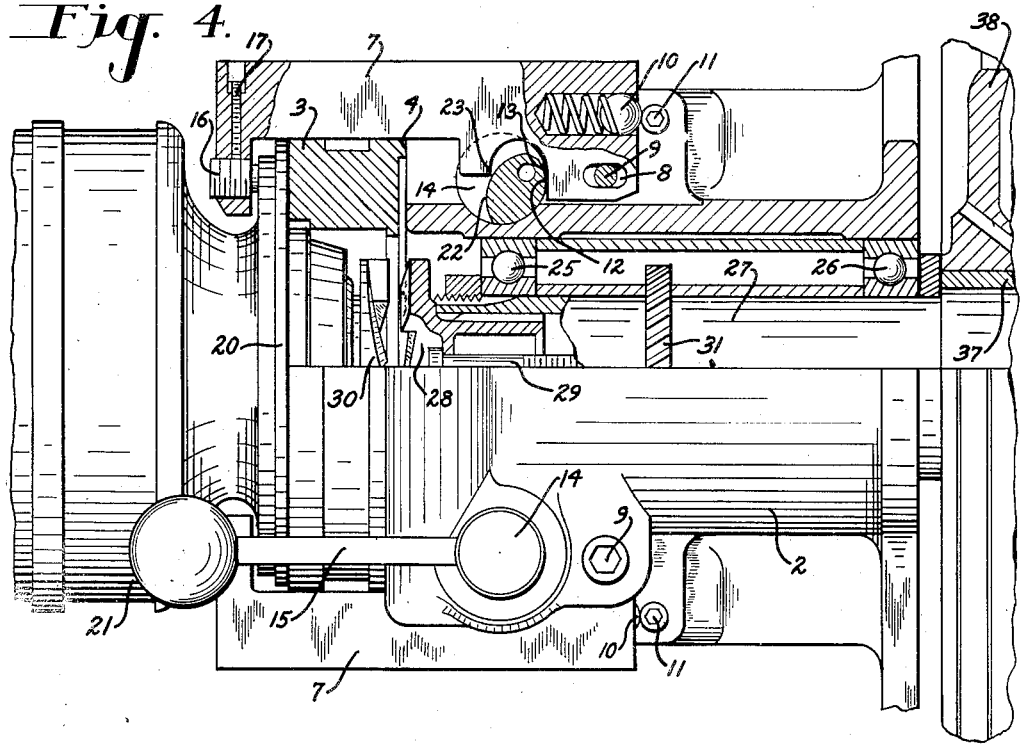
Figure 4 is an enlarged fragmentary view partly in top elevation and partly in section showing the starter clamping mechanism in clamped position.
Figure 5:
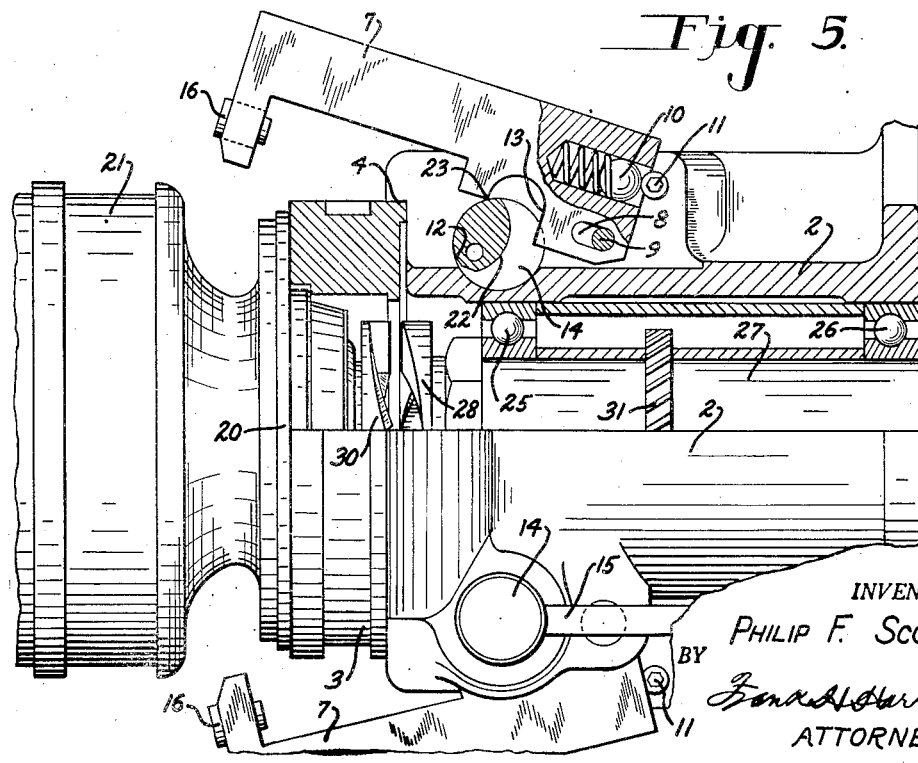
Figure 5 is a view similar to Figure 4 showing the starter clamping arms released from the starter.

Referring now to Figures 4 and 5, each of the clamping arms 7 is loosely pivoted by means of a slot 8 to a vertical pin 9 on a side portion of the head 2. A spring operated ball detent 10 is contained in the rear end of each arm 7 in a position to bear against an upstanding post or screw head 11 on the head 2 to resiliently urge the arm 7 into clamping position as shown in Figure 4. Clamping engagement of each arm 7 is positively maintained by engagement of a cam surface 12 with a heel portion 13 on the arm. The cam surface 12 is formed from a vertical shaft portion 14 journaled in the head 2 adjacent the pin 9, said shaft having a lever arm or handle 15 on its upper end. It will be seen from Figure 4 that when the lever arms 15 are swung forwardly the cam surface 12 shown in section will be rotated in a counterclockwise direction to engage the heel portion 13 and move the clamping arm 7 rearwardly on the pin 9. The forward end of the clamping arm 7 carries an adjustable flange engaging screw 16 which may be locked by a set screw 17 in the proper position to firmly engage a mounting flange 20 of a particular thickness on a starter 21. The slope of the cam surface 12 is a very gradual one so that the above described clamping action will maintain itself by frictional force when the parts are brought to the position shown in Figure 4.

To unclamp a starter it is merely necessary to rotate the handles 15 outwardly and rearwardly so as to rotate the shaft 14 having the cam shown in section in a clockwise direction. This rotation withdraws each cam surface 12 from the heel 13, allowing the detents 10 to move the arms 7 longitudinally forwardly, and brings a back cam surface 22 to engage a toe portion 23 on each arm 7 to swing the arm outwardly to the open position shown in Figure 5. In the open position the resilient force exerted by the ball detents 10 causes both clamping arms 7 to bear against the cam surfaces. Then when the handles 15 are rotated forwardly to clamp a starter each toe portion 23 will follow the cam surface inwardly until the arms 7 are parallel with the starter, and overlying its mounting flange in position to be moved longitudinally rearwardly upon further rotation of the shafts 14 in the manner described above to exert a positive clamping action.

The clamping arms 7 may be described as quick-acting and self positioning in view of their compound pivotal and longitudinal movements in clamping and releasing a starter mounting flange by individual cam actuation as above described. These arms are designed to satisfactorily clamp the various diameters of flanges accommodated by the two sides of mounting plate 3.

The head 2 is of general cylindrical shape to receive therewithin a pair of bearing assemblies 25 and 26 mounting a rotatable shaft 27. The shaft 27 is hollow and carries in its forward end a splined jaw clutch member 28, removably secured by a screw 29, in position to be engaged by a jaw member 30 on the starter. The shaft 27 also carries a gear 31 for a tachometer drive, to be referred to later.

Referring now to Figure 2 the shaft 27 carries at its rear end a brake drum 35 rigidly attached thereto by means of a flange and hub construction 36. On the shaft 27 between the head 2 and the flange and hub construction 36 is a floating bearing 37 carrying a brake assembly plate 38. The brake plate 38 carries a pair of brake shoes 39 arranged in braking relation with the drum 35 and is externally provided with a pair of oppositely extending torque arms 40 and 41. Coarse adjustment of the brake shoes may be effected by a conventional wedge adjusting mechanism 42 having a square ended adjusting screw 43 accessible on the forward side of the brake plate 38.

The brake shoes 39 are brought to bear against the drum 35 through the action of a lever 44 operable by a flexible brake cable 45 as shown in Figure 3. The brake cable 45 is tensioned by a hand wheel 46 on a screw threaded member operating in a supporting sleeve 47 on the plate 38 as shown in Figure 1. The sleeve 47 is preferably provided with a scale 48 which is uncovered by the axial movement of an end 49 on a surrounding sleeve 50 integral with the hand wheel 46 whereby markings on the scale may be observed to roughly duplicate former brake settings and torque loads. These calibrations indicate hand wheel turns and experience will enable the operator to approximate in advance the desired torque load by the preliminary setting of the hand wheel. Fine brake adjustment necessitated by brake shoe wear, cable stretch, heat of the brake drum, etc., may be made conveniently with an ordinary wrench on an adjusting nut 51 on the hand wheel hub.

Opposite sides of the lower part of the base 1 are provided with rigid abutments 55 and 56 directly beneath the arms 40 and 41 for connection with a torque indicator 57. As shown in Figure 1 the torque indicator 57 makes pivotal connection with the base abutment 56 through a bearing pin 58 and makes pivotal connection with the torque arm 41 through a similar pin connector 59, the end of the torque arm being preferably bifurcated in the same manner as abutment 56 to carry the pin 59. The torque indicator 57 is a force measuring instrument stressed in compression by the downward force exerted by the arm 41 and may be calibrated in units of torque.

The brake plate 38 carrying the above-described brake assembly, the torque arms 40 and 41 and the brake tensioning hand wheel 46 ride free on the shaft 27 and are positioned solely by the connection of the arm 41 with the torque indicator which is in turn anchored to the base abutment 56. The torque indicator 57 being constructed for receiving the application of force in compression will be connected with the arm 41 and the abutment 56 on the right side of the device when the rotation of shaft 27 is clockwise as viewed in Figure 1, and will be connected with the arm 40 and abutment 55 on the left side of the device for counterclockwise rotation. Force measuring indicators operable in tension rather than compression may be employed by merely connecting the indicator to the proper brake arm to utilize a tension rather than a compressive force.

The numeral 60 indicates a tachometer connected through a flexible cable 61 with a gear 62 driven by the previously mentioned gear 31 on the shaft 27. Duplicate fittings 63 and 64 enable the connection of the tachometer on either side of the base, so as to be adjacent the torque meter. The dial of the tachometer is preferably arranged for indicating speeds in either direction, the direction of movement of the indicator from a central zero position automatically indicating the direction of rotation.

The device is preferably mounted on and securely bolted to a heavy bench or other suitable foundation of sufficient rigidity to prevent overturning under locked brake test conditions. By tightening the brake setting sufficiently the present device is adapted to be used for a locked rotor test simulating the conditions encountered in attempting to crank a frozen engine, as well as normal operating tests with the brakes set to simulate the load imposed upon the starter in a normal cranking operation.

Thus the present device operates on the general principle of a prony brake dynamometer, but the refinements of its novel construction adapt it particularly to the rapid testing of aircraft starters in the field. It is portable and rugged and will give reliable results in the hands of relatively unskilled operators. The reversible mounting plate and interchangeable jaw members, together with the twin torque arms, render the device adaptable to starters having different size base flanges, different jaw members, and having either right or left hand rotation. Change overs from one type of starter to another are readily effected without dismantling, and without affecting the quick acting, self-positioning clamping means. Also, by suitably modifying the mounting plate 3 and removable jaw member 28, the present device may be employed for torque and dynamometer tests on other specialized apparatus, or for general application.

Various changes may be made in the construction and arrangement of parts and all such modifications are included in the invention, the same being limited only by the scope of the appended claims.

I claim:

1. A starter test stand comprising a base, a shaft in said base arranged for driving engagement by said starter, a brake drum rigidly mounted on said shaft, a brake shoe plate associated with said brake drum, a brake cable for actuating said brake shoes, a hand wheel on said brake shoe plate for tensioning said cable, a graduated scale associated with said hand wheel to facilitate the setting of predetermined brake loadings, and adjusting means associated with said hand wheel to compensate for brake wear and the like without disturbing hand wheel settings on said scale.

2. In a starter test stand, a housing adapted to position a starter for driving engagement with a rotatable shaft, a pair of clamping arms pivoted on said housing for rotational and longitudinal movements, individual cam means in said housing for moving said arms longitudinally to establish and maintain a firm clamping engagement with a starter base flange and to swing said arms outwardly to release said base flange.

3. In a starter test stand, a housing adapted to position a starter for driving engagement with a rotatable shaft, a pair of clamping arms pivoted on said housing for rotational and longitudinal movements, resilient means for swinging said arms inwardly to grasp a starter base flange, cam means rotatable in one direction to move said arms longitudinally from a grasping to a clamping position, and rotatable in a reverse direction to release said clamping action and swing said arms outwardly to disengage said base flange.

4. In a starter test stand, a base housing carrying a rotatable shaft adapted to receive interchangeable jaw members for engagement by different starters, a reversible mounting plate on said base having opposite faces adapted to match different starter mounting flanges to position a starter in driving engagement with a jaw member on said shaft, a pair of quick release clamping arms pivoted on said base, and means on said arms to adjust for starter flange thickness in order to clamp a starter securely to said mounting plate in position for said engagement as said clamping arms overlap said mounting plate to engage said mounting flange.

PHILIP F. SCOFIELD.